(12) United States Patent
Ueo et al.

(10) Patent No.: US 8,478,469 B2
(45) Date of Patent: Jul. 2, 2013

(54) POWER SOURCE SYSTEM FOR ELECTRIC POWERED VEHICLE AND CONTROL METHOD THEREFOR

(75) Inventors: Daisuke Ueo, Toyota (JP); Tomokazu Masuda, Kasugai (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/321,039

(22) PCT Filed: Aug. 7, 2009

(86) PCT No.: PCT/JP2009/064020
§ 371 (c)(1),
(2), (4) Date: Nov. 17, 2011

(87) PCT Pub. No.: WO2011/016134
PCT Pub. Date: Feb. 10, 2011

(65) Prior Publication Data
US 2012/0123625 A1  May 17, 2012

(51) Int. Cl.
*B60L 9/00* (2006.01)
(52) U.S. Cl.
USPC .......................................................... 701/22
(58) Field of Classification Search
USPC ............................................ 701/22; 307/9.1
See application file for complete search history.

(56) References Cited

U.S. PATENT DOCUMENTS

| 2009/0001926 | A1 | 1/2009 | Sato |
| 2010/0054007 | A1* | 3/2010 | Jung ............................. 363/126 |
| 2010/0270860 | A1* | 10/2010 | Kamaga ........................ 307/10.7 |
| 2011/0187184 | A1 | 8/2011 | Ichikawa |

FOREIGN PATENT DOCUMENTS

| JP | A-07-111735 | 4/1995 |
| JP | A-08-107605 | 4/1996 |
| JP | A-2007-228753 | 9/2007 |
| JP | A-2008-187884 | 8/2008 |
| JP | A-2009-027774 | 2/2009 |
| JP | A-2009-225587 | 10/2009 |
| JP | A-2010-279159 | 12/2010 |

OTHER PUBLICATIONS

International Search Report issued in International Patent Application No. PCT/JP2009/064020 dated Nov. 10, 2009.
U.S. Appl. No. 12/808,550, filed Jan. 21, 2009 in the name of Ichikawa.

* cited by examiner

*Primary Examiner* — James Trammell
*Assistant Examiner* — Michael D Lang
(74) *Attorney, Agent, or Firm* — Oliff & Berridge, PLC (57) ABSTRACT

At the time of external charging, an external charging relay is turned on, and a system main relay is turned off. Therefore, a main battery can be charged by electric power from an external power source, without applying an output voltage of the main battery to a PCU. At the time of external charging, basically, a power supply voltage for an auxiliary system (low voltage system) is generated by a sub DC/DC converter of a small capacity, while a main DC/DC converter of a large capacity used when vehicle is running is stopped. Only when the output of sub DC/DC converter is insufficient to cover the power consumption by the auxiliary system, an ECU operates the main DC/DC converter. Therefore, ECU and auxiliary load group can be operated reliably while efficiency of external charging is improved.

12 Claims, 5 Drawing Sheets

POWER SOURCE SYSTEM FOR ELECTRIC POWERED VEHICLE AND CONTROL METHOD THEREFOR

TECHNICAL FIELD

The present invention relates to a power source system for an electric powered vehicle and to a method of controlling the same. More specifically, the present invention relates to a power source system for an electric powered vehicle mounting a power storage device chargeable by a power source outside the vehicle, as well as to the method of controlling the same.

BACKGROUND ART

Electric vehicles, hybrid vehicles and fuel cell vehicles have been known as electric powered vehicles configured such that an electric motor for driving the vehicle can be driven by electric power from a power storage device mounted on the vehicle represented by a secondary battery. For an electric powered vehicle, a configuration for charging the power storage device mounted on the vehicle by a power source outside the vehicle (hereinafter also simply referred to as an "external power source") has been proposed. In the following, charging of a power storage device by an external power source will also be simply referred to as "external charging."

By way of example, Japanese Patent Laying-Open No. 2009-027774 describes a configuration of an externally chargeable vehicle, including a battery B1 chargeable from the outside of the vehicle, a DC/DC converter 33 lowering the voltage of battery B1, a battery B3 charged by the output of DC/DC converter 33, and an auxiliary load 35 receiving power supply from battery B3.

Particularly, in the configuration of PTL 1, DC/DC converter 33 is operated continuously while the vehicle is running, and DC/DC converter 33 is operated intermittently in accordance with the voltage output from battery B3 while the vehicle is externally charged. This improves charging efficiency at the time of external charging.

CITATION LIST

Patent Literature

PTL 1: Japanese Patent Laying-Open No. 2009-027774

SUMMARY OF INVENTION

Technical Problem

In the configuration of PTL 1, however, the DC/DC converter of a relatively large capacity used for operating the vehicle is also used for generating the voltage (charging voltage of battery B3) of the auxiliary system (low-voltage system). Therefore, even if intermittently operated, power loss of the DC/DC converter is relatively large and, therefore, improvement in the efficiency of external charging is limited. On the other hand, while realizing improved charging efficiency, a configuration that ensures reliable power supply must be adopted in order to prevent any failure of operations of low voltage system equipment even during external charging.

Further, according to PTL 1, in order to supply electric power to the DC/DC converter even during external charging, the voltage of battery B1 as a main battery is applied to high voltage system circuits such as a boosting converter and an inverter. Since the voltage of main battery is applied to the high voltage system circuits even during external charging while the vehicle is not running, there is also a possibility that durability life of equipment is reduced.

The present invention was made to solve the above-described problems and its object is, in an electric powered vehicle chargeable by an external power source, to improve charging efficiency while reliably supplying electric power to the low voltage system, as well as to prevent reduction of durability life of equipment possibly caused by external charging.

Solution to Problem

The present invention provides a power source system for an electric powered vehicle chargeable by an external power source outside of the vehicle, including: rechargeable main and sub power storage devices, a charger, a power control unit, first and second switches, a plurality of auxiliary loads, first and second voltage converters, and a controller. The charger is for converting electric power supplied from the external power source to an electric power for charging the main power storage device, at a time of external charging for charging the main power storage device by the external power source. The power control unit is for controlling driving of an electric motor for generating vehicle driving power, by electric power conversion between the main power storage device and the electric motor. The first switch is connected between the main power storage device and the power control unit. The second switch is connected parallel to the first switch, between the charger and the main power storage device. The plurality of auxiliary loads are formed to operate by the supply of electric power for auxiliary system from a power supply line connected to the sub power storage unit. The first voltage converter converts an output voltage of the main power storage unit to a level of an output voltage of the sub power storage device and outputting to the power supply line. The second voltage converter has an output capacity smaller than the first voltage converter, and converts an output voltage of the charger to the level of the output voltage of the sub power storage device and outputting to the power supply line. The controller is operated by electric power supplied from the sub power storage device, for controlling open/close of the first and second switches as well as operation and stop of the first and second voltage converters. The controller is adapted such that at the start of the external charging, the first switch is opened and the second switch is closed, the first voltage converter is stopped and the second voltage converter is operated, and when the electric power for the auxiliary system is determined to be insufficient during execution of the external charging, the first voltage converter is operated.

The present invention provides a method of controlling a power source system for an electric powered vehicle chargeable by an external power source outside of the vehicle; wherein the power source system includes the main and sub power storage devices, the charger, the power control unit, the first and second switches, the plurality of auxiliary loads and the first and second voltage converters as described above. The control method includes the steps of: confirming that the first switch is opened at the start of external charging; when opening of the first switch is confirmed, closing the second switch, and activating the second voltage converter; after closing the second switch, externally charging the main power storage device by an output of the charger; and if the electric power for the auxiliary system is determined to be insufficient during the external charging, operating the first voltage converter.

According to the power source system for the electric powered vehicle and the control method therefor described above, at the time of external charging, a first voltage converter (main DC/DC converter) is stopped while the auxiliary system electric power is supplied by a second voltage converter (sub DC/DC converter). Therefore, efficiency of external charging can be improved. Further, if the output from the second voltage converter is insufficient for the electric power to the auxiliary system, the first voltage converter may be operated and, therefore, the controller and the auxiliary load can reliably be operated. Further, at the time of external charging, the first switch is opened, so that unnecessary application of a high voltage (output voltage of main power storage device) to the circuits and equipment in the succeeding stage such as the power control unit can be prevented. As a result, reduction of equipment life caused by external charging can be prevented. Thus, at the time of external charging, electric power to the low voltage system can reliably be supplied and charging efficiency is improved, while reduction of equipment life caused by external charging can be prevented.

Preferably, if it is determined that insufficiency of the electric power for the auxiliary system is solved while the first voltage converter is operating during execution of the external charging, the controller again stops operation of the first voltage converter, so that the electric power for the auxiliary system is supplied by the output of the second voltage converter. Alternatively, the control method further includes the step of again stopping operation of the first voltage converter, if it is determined that insufficiency of the electric power for the auxiliary system is solved while the first voltage converter is operating during execution of the external charging.

By such an approach, the operation of first voltage converter at the time of external charging can be minimized and, therefore, efficiency of external charging can further be improved.

Preferably, the first switch is connected between a main power supply line connected to the power control unit and the main power storage device. The first voltage converter is electrically connected between the main power supply line and the power supply line. The controller is adapted such that when, the first voltage converter is operated during execution of the external charging, the first switch is also closed.

By such an approach, even in a system configuration that the output voltage of the main power storage device is not applied to the first voltage converter at the start of external charging, the efficiency of charging can be improved while electric power to the low voltage system is reliably supplied at the time of external charging, and reduction of equipment life caused by external charging can be prevented.

More preferably, the controller is adapted such that if an output of the sub power storage device becomes lower than a prescribed lower limit level while the electric powered vehicle is not running, the first switch is closed and the first voltage converter is operated, so that the sub power storage device is charged by the electric power from the main power storage device. Alternatively, the control method further includes, if an output of the sub power storage device becomes lower than a prescribed lower limit level while the electric powered vehicle is not running, the step of closing the first switch and operating the first voltage converter, so that the sub power storage device is charged by the electric power from the main power storage device.

By such an approach, even in a system configuration that the output of main power storage device is unavailable at the start of external charging, charging of the sub power storage device can be controlled while the vehicle is not running to ensure the lower limit level output necessary to start the external charging.

Preferably, the plurality of auxiliary loads include a first auxiliary load electrically connected through a third switch to the power supply line, and a second auxiliary load electrically connected to the power supply line not through the third switch. The controller opens the third switch at the time of external charging.

By such an approach, the destination to which electric power is supplied in the auxiliary system (low voltage system) at the time of external charging can be narrowed. Thus, the output capacity of the second voltage converter (sub DC/DC converter) can further be reduced. As a result, efficiency of external charging can further be improved.

More preferably, it is determined by the controller or at the operating step that the electric power for the auxiliary system is insufficient, when a voltage of the power supply line becomes lower than a prescribed voltage during execution of the external charging. Particularly, the prescribed voltage is determined corresponding to a lower limit voltage ensuring operations of the plurality of auxiliary loads and the controller.

By such an approach, it becomes possible to reliably supply electric power to the low voltage system (auxiliary system) so as not to cause any trouble in the operation of auxiliary machines (particularly, ECU) because of lowering of power supply voltage to the auxiliary system (low voltage system).

Advantageous Effects of Invention

According to the present invention, in an electric powered vehicle chargeable by an external power source, charging efficiency can be improved while electric power is reliably supplied to the low voltage system, and reduction of durability life of equipment caused by external charging can be prevented.

DESCRIPTION OF EMBODIMENTS

In the following, embodiments of the present invention will be described in detail with reference to the figures. In the following, the same or corresponding portions in the figures are denoted by the same reference characters and, basically, description thereof will not be repeated.

Figure 1:
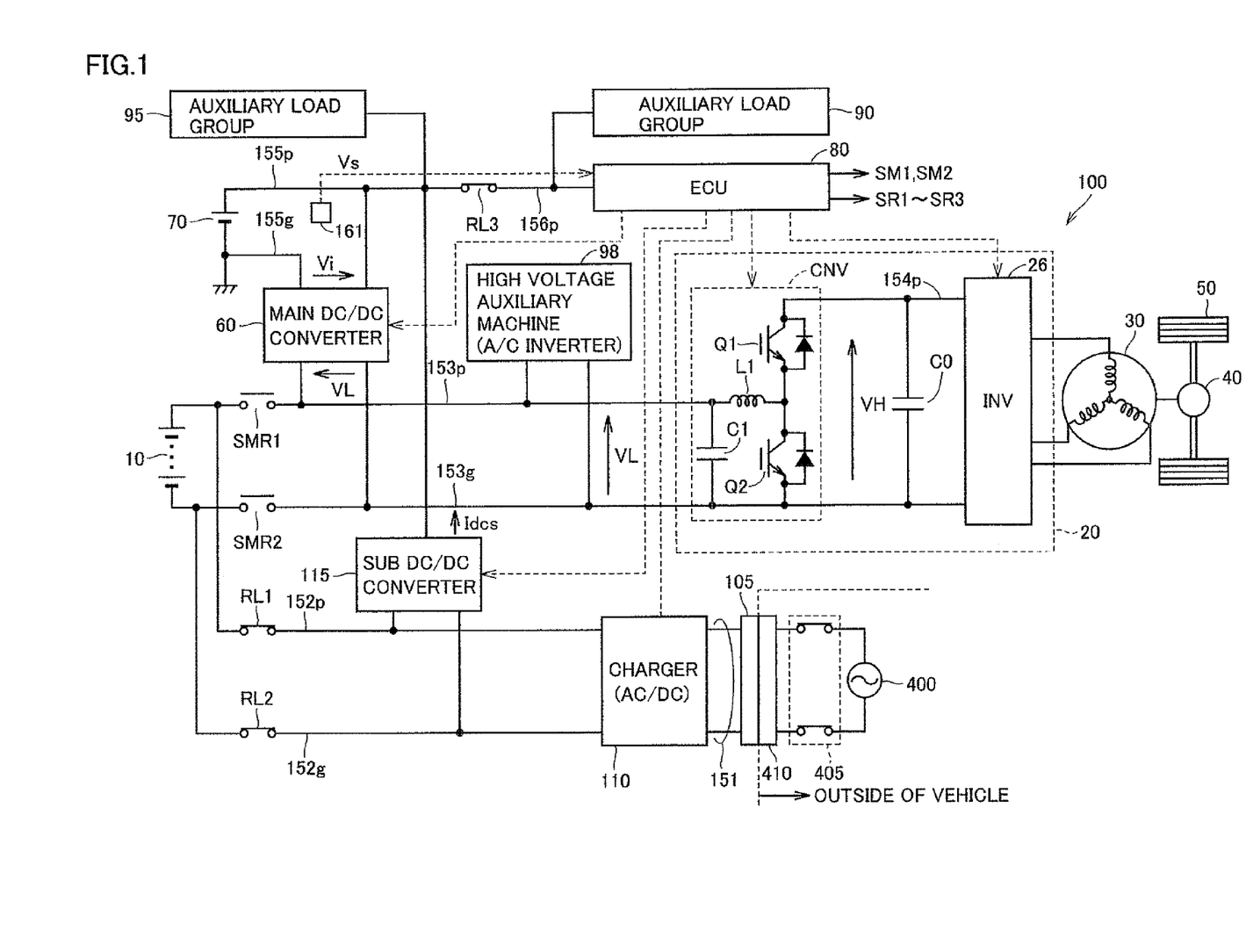
FIG. 1 is a block diagram showing a configuration of the power source system for an electric powered vehicle in accordance with an embodiment of the present invention.

FIG. 1 is a block diagram showing a configuration of a power source system for an electric powered vehicle in accordance with an embodiment of the present invention.

Referring to FIG. 1, an electric powered vehicle 100 includes a main battery 10, a power control unit (PCU) 20, a motor generator 30, a power transmission gear 40, driving wheels 50, and an ECU (Electric Control Unit) 80.

Main battery 10 is shown as an example of a "power storage device" and typically formed by a secondary battery such as a lithium ion battery or a nickel hydride battery. By way of example, output voltage of main battery 10 is about 200V. Alternatively, the power storage device may be formed by an electric double layer capacitor, or by a combination of a secondary battery and a capacitor.

PCU 20 converts electric power stored in main battery 10 to electric power for controlling driving of motor generator 30. By way of example, motor generator 30 is implemented by permanent magnet type three-phase electric motor, and PCU 20 is formed to include an inverter 26.

An output torque of motor generator 30 is transmitted through power transmission gear 40 fowled by a reduction gear or a power split device to driving wheels, whereby electric powered vehicle 100 runs. At the time of regenerative braking of electric powered vehicle 100, motor generator 30 can generate electric power by the rotational force of driving wheels 50. The generated electric power is converted by PCU 20 to electric power for charging main battery 10.

Further, in a hybrid vehicle having an engine (not shown) in addition to motor generator 30, through coordinated operations of the engine and motor generator 30, vehicle driving force necessary for electric powered vehicle 100 is generated. Here, it is also possible to charge main battery 10 by using electric power generated by engine rotation.

Specifically, electric powered vehicle 100 represents a vehicle that mounts an electric motor for generating power for driving the vehicle, and includes a hybrid vehicle in which the vehicle driving power is generated by engine and electric motor, and an electric vehicle and a fuel cell vehicle, not mounting an engine.

The "power source system for an electric powered vehicle" is formed by the configuration of electric powered vehicle 100 shown in the figure, with motor generator 30, power transmission gear 40 and driving wheels 50 removed. In the following, the configuration of power source system will be described in detail.

Power control unit (PCU) 20 includes a converter CNV, a smoothing capacitor C0 and inverter 26.

Converter CNV is formed to perform DC voltage conversion between a DC voltage VL of a power supply line 153$p$ and a DC voltage VH of a power supply line 154$p$.

Power supply line 153$p$ and a ground line 153$g$ are electrically connected to a positive electrode terminal and a negative electrode terminal of main battery 10 through system main relays SMR1 and SMR2, respectively. Smoothing capacitor C0 is connected to power supply line 154$p$ and smoothes a DC voltage. Similarly, a smoothing capacitor C1 is connected to a power supply line 153$p$ and smoothes DC voltage VL.

Converter CNV is formed as a chopper circuit including power semiconductor switching elements (hereinafter also simply referred to as "switching elements") Q1 and Q2, a reactor L1 and a smoothing capacitor C1, as shown in FIG. 1. Anti-parallel diodes are connected to switching elements Q1 and Q2, respectively, and therefore, converter CNV can execute bi-directional voltage conversion between power supply lines 153$p$ and 154$p$. Further, by fixing on switching element Q1 as an upper arm element and fixing off switching element Q2 as a lower arm element, converter CNV can be operated to equalize (VH=VL) the voltages of power supply lines 153$p$ and 154$p$.

Inverter 26 is a general three-phase inverter and, therefore, detailed circuit structure thereof is not shown. By way of example, inverter 26 is formed such that upper and lower elements are arranged for each phase, and a node between upper and lower arm elements of each phase is connected to a stator coil winding of the corresponding phase of motor generator 30.

When electric powered vehicle 100 is running, on/off of each switching element of inverter 26 is controlled by ECU 80, whereby the DC voltage on power supply line 154$p$ is converted to three-phase AC voltage and supplied to motor generator 30. Alternatively, at the time of regenerative braking of electric powered vehicle 100, on/off of each switching element of inverter 26 is controlled by ECU 80 such that the AC voltage from motor generator 30 is converted to a DC voltage and output to power supply line 154$p$.

ECU 80 is formed by an electric control unit including a CPU (Central Processing Unit), not shown, and a memory, and formed to perform operations using values detected by various sensors, based on a map and a program stored in the memory. At least a part of ECU 80 may be formed to execute prescribed numerical/logical operation by hardware such as an electronic circuit.

ECU 80 is generally represented as a block having a control function when the vehicle is running and when electric powered vehicle 100 is externally charged. ECU 80 operates when a power supply voltage of low voltage system is supplied from a power supply line 156$p$. In the present embodiment, the expression "vehicle is running" represents the state in which electric powered vehicle 100 is able to run by an operation, for example, of an ignition switch. Specifically, "vehicle is running" also covers a state when vehicle speed=0. It is noted that external charging of main battery 10 is never performed while the vehicle is running.

The power source system for electric powered vehicle 100 further includes, as a configuration of low voltage system (auxiliary system), a main DC/DC converter 60, an auxiliary battery 70, power supply lines 155$p$ and 156$p$, and a relay RL3. Auxiliary battery 70 is connected to power supply line 155$p$ and ground line 155$g$. Auxiliary battery 70 is also shown as an example of the "power storage device", as in the case of main battery 10. By way of example, auxiliary battery 70 is formed of a lead battery. The output voltage of auxiliary battery 70 corresponds to a power supply voltage Vs of the low voltage system. Rating of power supply voltage Vs is lower than the output voltage of main battery 10 and, for example, it is about 12V.

Main DC/DC converter 60 is formed to lower the DC voltage VL that corresponds to the output voltage of main battery 10 to be converted to a power supply voltage Vs of the low voltage system, that is, the DC voltage of the output voltage level of auxiliary battery 70. Main DC/DC converter 60 is typically a switching regulator including a semiconductor switching element (not shown), and a well-known arbitrary circuit structure may be adopted.

The output side of main DC/DC converter 60 is connected to power supply line 155$p$. The input side of main DC/DC converter 60 is connected to power supply line 153$p$ and ground line 153$g$. It is noted, however, that even when the input side is connected directly to the positive and negative electrodes of main battery 10 not through system main relays SMR1 and SMR2, main DC/DC converter 60 can generate the power supply voltage Vs of low voltage system, from the output of main battery 10.

Between power supply lines 155p and 156p, a relay RL3 is electrically connected. Relay RL3 is a relay controlling power supply to equipment forming power train, and basically it is turned on when the system of electric powered vehicle is activated (for example, at the time of IG on). Specifically, when the vehicle is running, relay RL3 is on. Further, even if IG switch is off, relay RL3 is turned on at the time of external charging.

To power line 155p, a group of auxiliary loads 95 of low voltage system that operates even when IG is off is connected. Auxiliary load group 95 includes, for example, audio equipment, navigation equipment, and illumination devices (hazard lamp, room lamp, head lamp and the like). The group of auxiliary loads operates in accordance with a user operation when the vehicle is running and when it is externally charged, and consumes electric power.

To power supply line 156p, a group of auxiliary loads 90 of low power system that operates when IG is on is connected, in addition to ECU 80. Part of the group of auxiliary loads 90 operates and consumes power even during external charging. Though shown as separate elements in FIG. 1, charger 110, main DC/DC converter 60 and sub DC/DC converter 115 may also be included in the group of auxiliary loads 90 when classified considering the power supply system.

Further, to power supply line 153p and ground line 153g, a high-voltage auxiliary machine 98 is connected, which operates using the output voltage of main battery 10 as a power source. High-voltage auxiliary machine 98 includes, for example, an inverter for air conditioner (A/C inverter).

Further, the power source system for electric powered vehicle 100 includes, as a configuration for external charging of main battery 10, a charging connector 105, a charger 110, a sub DC/DC converter 115 and relays RL1 and RL2.

Charging connector 105 is electrically connected to external power source 400 as it is connected to a charging plug 410 of a charging cable, which is connected to external power source 400. It is assumed that the charging cable contains a relay 405 for cutting off a charging path of external power source 400. Generally, the external power source is provided as a commercial AC power supply.

In place of the configuration shown in FIG. 1, a configuration in which external power supply 400 and electric powered vehicle 100 are electromagnetically coupled in non-contact manner to supply electric power may be used. Specifically, a primary coil is provided on the side of external power source, a secondary coil is provided on the side of the vehicle, and utilizing the mutual inductance between the primary and secondary coils, electric power may be supplied from external power source 400 to electric powered vehicle 100. Even when such external charging is performed, configuration following charger 110 for converting the electric power from external power source 400 is common.

Power supply line 151 electrically connects charging connector 105 and charger 110. Charger 110 converts the AC voltage from external power source 400 transmitted to power supply line 151 to a DC voltage for charging main battery 10. The converted DC voltage is output across power supply line 152p and ground line 152g. By feedback control of output voltage and/or output current, charger 110 charges main battery 10 in accordance with a charge command at the time of external charging. The charge command is set in accordance with the state of main battery 10, for example, SOC (State Of Charge) and temperature.

Relay RL1 is electrically connected between power supply line 152p and a positive electrode of main battery 10. Relay RL2 is electrically connected between ground line 152g and the negative electrode of main battery 10.

Sub DC/DC converter 115 converts the DC voltage (charging voltage of main battery 10) converted by charger 110 to the power supply voltage Vs of low voltage system (auxiliary system), that is, the DC voltage of the output voltage level of auxiliary battery 70. The output of sub DC/DC converter 115 is supplied to power supply line 155p. Sub DC/DC converter 115 may be formed integrally with charger 110.

Sub DC/DC converter 115 is formed by a switching regulator including a semiconductor switching element (not shown) similar to main DC/DC converter 60, and a well-known arbitrary circuit structure may be adopted.

Each of relays RL1 to RL3 and system main relays SMR1 and SMR2 is formed by an electromagnetic relay that is closed (ON) when an excitation current is supplied by an excitation circuit, not shown, and opened (OFF) when the excitation current is not supplied. An arbitrary circuit element may be used as the relay or the system main relay provided that it is a switch allowing control of conduction (on)/non-conduction (off) of a conduction path. Relays RL1 and RL2 provided corresponding to the configuration for external charging are also referred to as "external charging relays."

ECU 80 generates control commands SM1, SM2 and SR1 to SR3, for controlling on/off of system main relays SMR1, SMR2 and relays RL1 to RL3. In response to each of control commands SM1, SM2 and SR1 to SR3, an excitation current for the corresponding system main relay or relay is generated, with auxiliary battery 70 being the power source.

Next, the operation of power source system when the vehicle is running and when it is externally charged will be described.

When the vehicle is running, system main relays SMR1 and SMR2 are turned on, while external charging relays RL1 and RL2 are turned off. Further, relay RL3 is turned on in response to turning on (IG on) of the ignition switch.

Consequently, the output voltage from main battery 10 is transmitted through system main relays SMR1 and SMR2 that are on, to power supply line 153p and ground line 153g. Specifically, the electric power on power supply line 153p electrically connected to main battery 10 is used for controlling driving of motor generator 30 by PCU 20. Further, by external charging relays RL1 and RL2 that are off, the external charging configuration including charger 110 is electrically disconnected from main battery 10 and from power supply line 153p and ground line 153g. As a result, running of electric powered vehicle 100 using the electric power of main battery 10 becomes possible, while the circuits for external charging including charger 110 can be protected.

In the low voltage system (auxiliary system), when the vehicle is running, sub DC/DC converter 115 is sopped while main DC/DC converter 60 operates, so that the power supply voltage Vs of low voltage system is generated from the output voltage of main battery 10. As relay RL3 is turned on, power supply voltage Vs is also supplied to ECU 80 and the group of auxiliary loads 90. The power capacity (rated output) of main DC/DC converter 60 is designed to be sufficient to cover the power consumption by auxiliary load groups 90 and 95 while the vehicle is running.

In contrast, at the time of external charging, external charging relays RL1 and RL2 are turned on, while system main relays SMR1 and SMR2 are turned off. Consequently, main battery 10 is charged by the DC voltage obtained by converting the AC power from external power source 400 by charger 110 through external charging relays RL1 and RL2, which are on.

Further, as system main relays SMR1 and SMR2 are off, power supply line 153p and ground line 153g are electrically disconnected from charger 110 and main battery 10. Therefore, the output voltage (DC voltage VL) of main battery 10 is not applied to the equipment of high voltage system including PCU 20, and hence, reduction of durability life of components forming the high voltage system equipment by external charging can be prevented.

In the low voltage system (auxiliary system), at the time of external charging, DC/DC converter 115 operates, and basically, main DC/DC converter 60 is stopped. Specifically, in main DC/DC converter 60, the switching element is fixed off, and therefore, power loss associated with power conversion is not incurred.

At the time of external charging, relay RL3 is turned on independent from the operation of ignition switch. Thus, even during external charging, it is possible to supply power supply voltage Vs to ECU 80 and the groups of auxiliary loads 90 and 95, by auxiliary battery 70 and/or sub DC/DC converter 115.

The power capacity (rated output) of sub DC/DC converter 115 is designed to cover the usual power consumption of auxiliary system (low voltage system) at the time of external charging. Specifically, the output capacity (for example, rated current in the order of 10 to 100 mA) of sub DC/DC converter 115 used at the time of external charging can be made lower than the output capacity (for example, rated current in the order of 100 A) of main DC/DC converter 60 that must cover the power consumption by ECU 80 and the groups of auxiliary loads 90 and 95 while the vehicle is running.

Specifically, the power consumption of sub DC/DC converter 115 is significantly smaller than the power consumption of main DC/DC converter 60. Therefore, by stopping main DC/DC converter 60 and generating power supply voltage Vs for the low voltage system by sub DC/DC converter 115 at the time of external charging, efficiency of external charging can be improved.

As the power capacity of sub DC/DC converter 115 is set low as described above, it may be possible that the output power of sub DC/DC converter 15 runs short, depending on the status of use of group 90 and/or group 95 of auxiliary loads. Therefore, in the power source system for an electric powered vehicle in accordance with the present embodiment, the power supply for the auxiliary system is controlled in the following manner.

Figure 2:
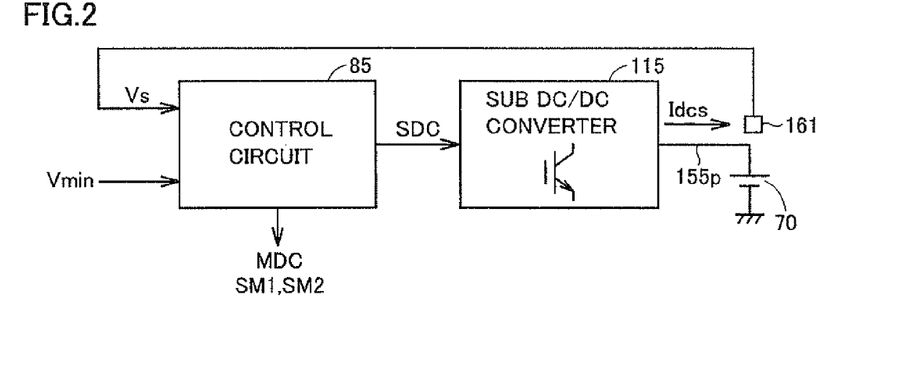
FIG. 2 is a block diagram representing auxiliary system power supply control at the time of external charging, by the power source system in accordance with an embodiment of the present invention.

FIG. 2 is a block diagram representing power supply control for the auxiliary system (low voltage system) at the time of external charging, by the power source system for an electric power vehicle in accordance with the present embodiment.

Referring to FIG. 2, a control circuit 85 controls operation and stop of sub DC/DC converter 15 by a control command SDC. Further, control circuit 85 generates a control command MDC instructing operation and stop of main DC/DC converter 60, and control commands SM1 and SM2 instructing on/off of system main relays SMR1 and SMR2. Control circuit 85 corresponds to a functional block controlling power supply to low voltage system at the time of external charging, realized by ECU 80.

When operated, sub DC/DC converter 115 outputs a rated voltage that corresponds to the power supply voltage for the low voltage system. By way of example, sub DC/DC converter 115 changes an output current Ides by controlling duty ratio of switching element so that the output of rated voltage can be maintained. The output current Ides changes within the range of rated, capacity (power, current) of sub DC/DC converter 115. Specifically, if the power consumption by the low voltage auxiliary system (hereinafter also referred to as auxiliary system power) cannot be covered by the maximum output current Imax that corresponds to the rated capacity, the power consumption by the groups 90 and 95 of auxiliary loads is covered by the electric power from auxiliary battery 70. Therefore, the SOC of auxiliary battery 70 lowers, and therefore, its output voltage (that is, power supply voltage Vs) also lowers. If the power supply voltage Vs should become lower than the lower limit voltage that ensures the operation of ECU 80, the power source system could possibly fail.

At the start of external charging, control circuit 85 instructs to stop main DC/DC converter 60 by control command MDC, and system main relays SMR1 and SMR2 are turned off.

During external charging, if it is determined that the output of sub DC/DC converter 115 is insufficient for the power consumption by the groups 90 and 95 of auxiliary loads, control circuit 85 operates main DC/DC converter 60 by control command MDC. At this time, the power to be supplied to the groups 90 and 95 of auxiliary loads may be generated both by main DC/DC converter 60 and sub DC/DC converter 115, or the power for the auxiliary system may be generated only by main DC/DC converter 60.

Thus, it is possible to supply power larger than that provided by sub DC/DC converter 115 to the groups 90 and 95 of auxiliary loads, using main DC/DC converter 60. In the exemplary configuration shown in FIG. 1, in order to connect main DC/DC converter 60 and main battery 10, it is necessary for control circuit 85 to turn on system main relays SMR1 and SMR2 by control commands SM1 and SM2.

As described above, when the output of sub DC/DC converter 115 runs short, the power supply voltage Vs lowers, and therefore, when the power supply voltage Vs comes to be lower than a prescribed lower limit voltage Vmin, control circuit 85 determines that the output of sub DC/DC converter 115 is insufficient. The lower limit voltage Vmin can be determined to correspond to the lower limit voltage that ensures operation of ECU 80 and the like, as described above.

Control circuit 85 may determine that the output of sub DC/DC converter 115 is insufficient by comparing a detected value and SOC of auxiliary battery 70, rather than using the power supply voltage Vs. The SOC of auxiliary battery 70 may be obtained by a general method of calculating battery SOC, for example, based on an accumulated value of charging/discharging currents detected by a current sensor, not shown, or based on an open voltage detected by a voltage sensor, not shown. Alternatively, control circuit 85 may determine whether or not the output of sub DC/DC converter 115 is insufficient, based on the state of operation (for example, on/off of each equipment) of the groups 90 and 95 of auxiliary loads. For example, the output of sub DC/DC converter 115 may be determined to be insufficient, when a specific auxiliary load (such as a headlight) that is not essentially used at the time of external charging but consumes relatively large power is operated.

Figure 3:
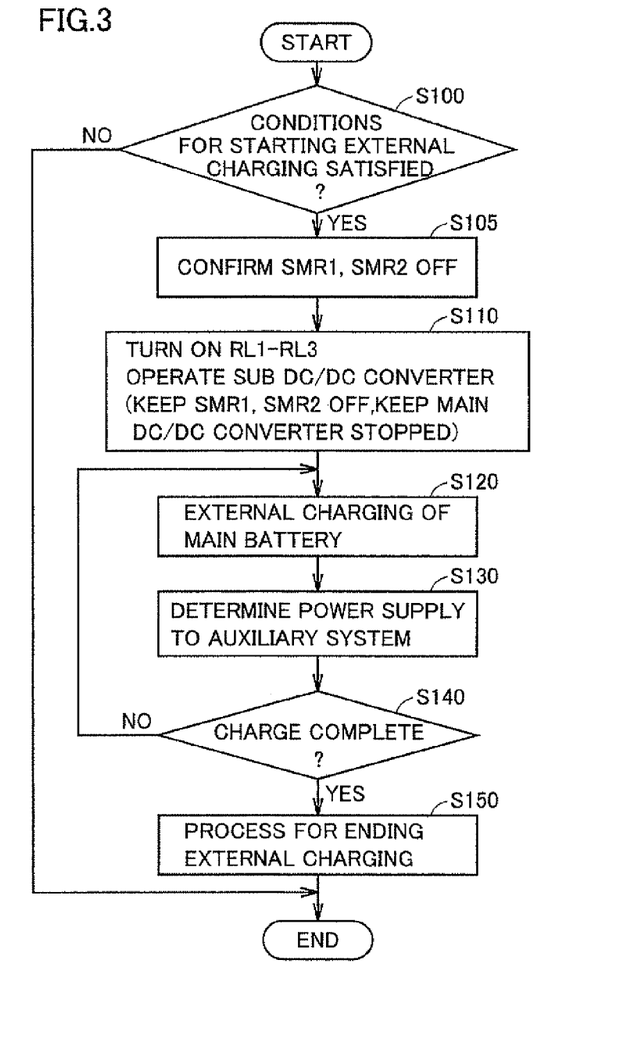
FIG. 3 is a flowchart representing process steps of control at the time of external charging, by the power source system in accordance with an embodiment of the present invention.

FIG. 3 is a flowchart representing process steps of control at the time of external charging, by the power source system in accordance with an embodiment of the present invention. It is noted that though each of the steps in the flowcharts below including FIG. 3 is basically realized by software processing by ECU 80, it may be realized by hardware processing.

Referring to FIG. 3, at step S100, ECU 80 determines whether or not conditions for starting external charging are satisfied. By way of example, if charging connector 105 is connected through a normally mounted charging cable (charging plug 410) to external power source 400 and the external charging is requested by a switch operation by a user or by automatic setting of time, for example, determination at step S100 is YES, and external charging starts. If determination at step S100 is NO, the following process steps are not executed.

When external charging starts (YES at S100), at step S105, ECU 80 confirms that system main relays SMR1 and SMR2 are off. If system main relays SMR1 and SMR2 are on, ECU 80 surely turns off system main relays SMR1 and SMR2 by control commands SM1 and SM2.

In order to start external charging, at step S110, ECU 80 turns on external charging relays RL1 and RL2 as well as relay RL3, and operates sub DC/DC converter 115. Further, ECU 80 stops main DC/DC converter 60 and keeps off system main relays SMR1 and SMR2.

When the start process of steps S100 to S110 ends, at step S120, ECU 80 charges main battery 10 by electric power from external power source 400, using charger 110. Then, during external charging, ECU 80 executes, at step S130, determination of power supply to the auxiliary system.

Figure 4:
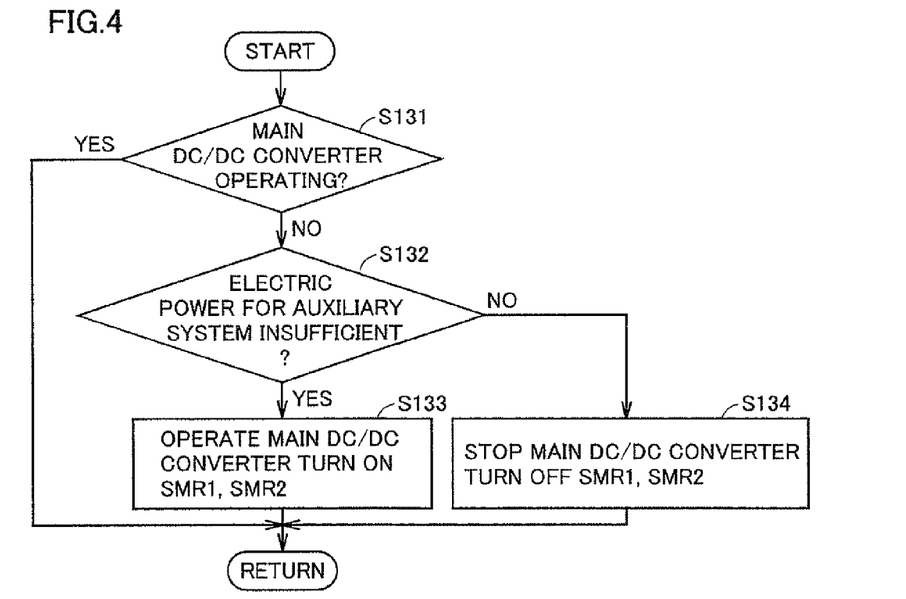
FIG. 4 is a flowchart representing a first example of auxiliary system power supply determination.

FIG. 4 shows details of the determination of power supply to the auxiliary system at step S130 of FIG. 3.

Referring to FIG. 4, at step S131, ECU 80 determines whether or not main DC/DC converter 60, which was stopped at the start of external charging, is operating. If main DC/DC converter 60 is operating (YES at S130), ECU 80 generates the power supply voltage for the low voltage system (auxiliary system) while maintaining the present state, that is, using main DC/DC converter 60.

If main DC/DC converter 60 is stopped (NO at S130), ECU 80 determines, at step S132, whether or not the electric power for the auxiliary system supplied from sub DC/DC converter 115 is insufficient. If the electric power for the auxiliary system is insufficient (YES at S132), at step S133, ECU 80 operates main DC/DC converter 60. In the exemplary configuration of FIG. 1, accordingly, system main relays SMR1 and SMR2 are turned on. Thus, using main DC/DC converter 60, and preferably using both the sub DC/DC converter 115 and main. DC/DC converter 60, the power supply voltage for the low voltage system (auxiliary system) is generated. As a result, operational electric power required by the ECU 80 and groups 90 and 95 of auxiliary loads can reliably be provided.

On the other hand, if the electric power for the auxiliary system is sufficient (NO at step S132), at step S134, ECU 80 maintains main DC/DC converter 60 in the stopped state. Specifically, determination at step S132 can be made in the similar manner as the generation of control command MDC by control circuit 85 shown in FIG. 3.

Figure 5:
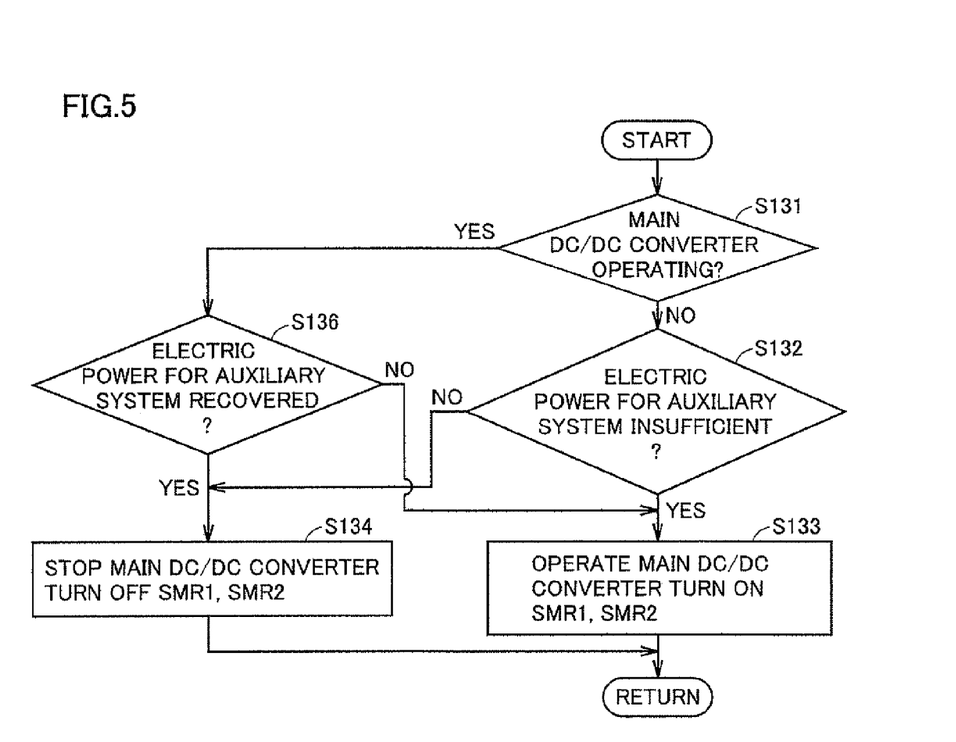
FIG. 5 is a flowchart representing a second example of auxiliary system power supply determination.

Alternatively, as a process after main DC/DC converter 60 operated once, a step S136 may be added as shown in FIG. 5, to the flowchart of FIG. 4.

If the determination at step S131 is YES, that is, if main DC/DC converter 60 is operating, ECU 80 determines, at step S136, whether or not the insufficiency of electric power for the auxiliary system was compensated for by the use of main DC/DC converter 60. If the power supply voltage Vs or SOC of auxiliary battery 70 recovers to a prescribed value or higher, determination at step S136 is YES, and otherwise, it is NO.

If it is YES at S136, the process proceeds to step S134 at which ECU 80 again stops main DC/DC converter 60. Further, system main relays SMR1 and SMR2 are also stopped. Thus, the power supply voltage for the low voltage system (auxiliary system) is again generated by sub DC/DC converter 115. By such an approach, the period of operation of main DC/DC converter 60 during external charging can be minimized and, therefore, efficiency of external charging can further be improved. If main DC/DC converter 60 again stops at step S134, when step S130 is executed next, the determination of step S131 becomes NO.

On the other hand, if determination at step S136 is NO, the process proceeds to step S133 at which ECU 80 maintains operation of main DC/DC converter 60. Thus, using main DC/DC converter 60, and preferably using both the sub DC/DC converter 115 and main DC/DC converter 60, the power supply voltage for the low voltage system is generated.

According to the flowchart of FIG. 4 or FIG. 5 as described above, by the determination of power supply to low voltage system (S130), in order to improve efficiency of external charging, the electric power for the auxiliary system can be supplied basically by sub DC/DC converter 115 of small capacity while stopping main DC/DC converter 60. Further, if the power consumption by ECU 80 and groups 90 and 95 of auxiliary loads cannot be ensured by the output of sub DC/DC converter 115, main DC/DC converter 60 is operated and, therefore, ECU and groups 90 and 95 of auxiliary loads of which operations are required can be normally operated.

Again referring to FIG. 3, ECU 80 performs external charging (S120) of main battery 10 while the electric power to the auxiliary system is supplied in accordance with the determination of power supply for the low power system at step S130. During external charging, ECU 80 determines, in every prescribed period, whether or not charging of main battery 10 is completed, at step S130. By way of example, determination of step S140 can be executed based on the SOC, amount of charging power, charging time and the like of main battery 10.

Until charging is complete, the determination at step S140 is NO and, therefore, steps S120 and S130 are executed repeatedly. Specifically, the power supply voltage for the low voltage system during external charging can be generated with stop and operation of main DC/DC converter 60 appropriately controlled in accordance with the state of power consumption, of the auxiliary system (low voltage system).

When charging is complete (YES at S140), at step S150, ECU 80 executes the process for ending the external charging. In the process for ending the external charging, by way of example, external charging relays RL1, RL2 and relay 405 (charging cable) that have been on are turned off.

As described above, according to the power source system in accordance with the present embodiment, at the time of external charging, main DC/DC converter 60 is stopped and the electric power for the auxiliary system is supplied by sub DC/DC converter 115, whereby efficiency of external charging can be improved. Further, if the output capacity of sub DC/DC converter 115 is insufficient to supply electric power for the auxiliary system, main DC/DC converter 60 can be operated. Therefore, ECU 80 and groups 90 and 95 of auxiliary loads can reliably be operated while improving efficiency of external charging.

Further, at the time of external charging, basically, system main relays SMR1 and SMR2 are turned off and, therefore, application of high voltage (output voltage of main battery 10) to circuitry of the succeeding stage such as PCU 20 of which operation is unnecessary can be avoided. As a result, reduction of durability life of equipment caused by external charging can be prevented.

In the power source system (FIG. 1) for an electric powered vehicle in accordance with the present embodiment, system main relays SMR1 and SMR2 are connected between main battery 10 and main DC/DC converter 60. Therefore, at the start of external charging, it is necessary to control relays (at least to turn on external charging relays RL1 and RL2 or system main relays SMR1 and SMR2) while the power supply voltage cannot be supplied by main DC/DC converter 60.

Therefore, it is necessary that the output of auxiliary battery 70 is reliably kept higher than the lower limit level that ensures supply of excitation current of the relay.

Figure 6:
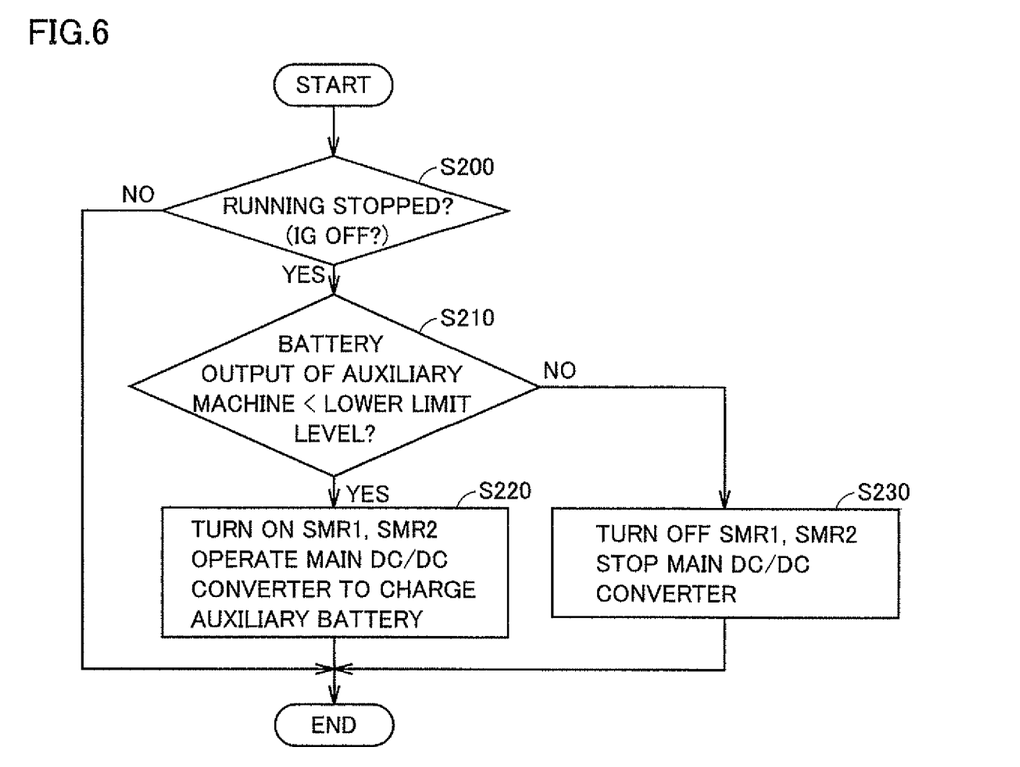
FIG. 6 is a flowchart representing an auxiliary battery charging control, when the vehicle running is stopped, by the power source system in accordance with an embodiment of the present invention.

Therefore, after the end of vehicle running, that is, in a period in which external charging is possible, it is preferred that ECU 80 executes the control process in accordance with the flowchart of FIG. 6 in every prescribed period, for charging control of auxiliary battery 70.

Referring to FIG. 6, at step S200, ECU 80 determines, in every prescribed period, whether or not the vehicle running is stopped, for example, if the ignition switch is off. Basically, if the vehicle running is stopped, that is, if the ignition switch is turned off, system main relays SMR1 and SMR2 are turned off and main DC/DC converter 60 is stopped.

When the vehicle running is stopped (YES at S200), ECU 80 confirms whether or not the output of auxiliary battery 70 at step S110 is lower than the lower limit level. By way of example, determination at step S210 is executed based on SOC of auxiliary battery 70 or power supply voltage Vs. The lower limit level is determined in accordance with the output level that can attain an output (for example, generation of excitation current) to turn on external charging relays RL1 and RL2 or system main relays SMR1 and SMR2.

If the output of auxiliary battery 70 is low (YES at S210), at step S220, ECU 80 turns on system main relays SMR1 and SMR2, and operates main DC/DC converter 60 to lower the output voltage of main battery 10, whereby auxiliary battery 70 is charged. Thus, the state of charge of auxiliary battery 70 is controlled such that the output of lower limit level mentioned above can be ensured even while the vehicle running is stopped.

On the other hand, if determination at S210 is NO, at step S230, ECU 80 turns off system main relays SMR1 and SMR2, and stops main DC/DC converter 60.

By the auxiliary battery charging control shown in FIG. 6, even in a configuration in which main DC/DC converter 60 is basically disconnected from main battery 10 at the start of external charging, the output of auxiliary battery 70 required for the external charging starting process can be ensured.

(Modification of Power Source System Configuration)

Figure 7:
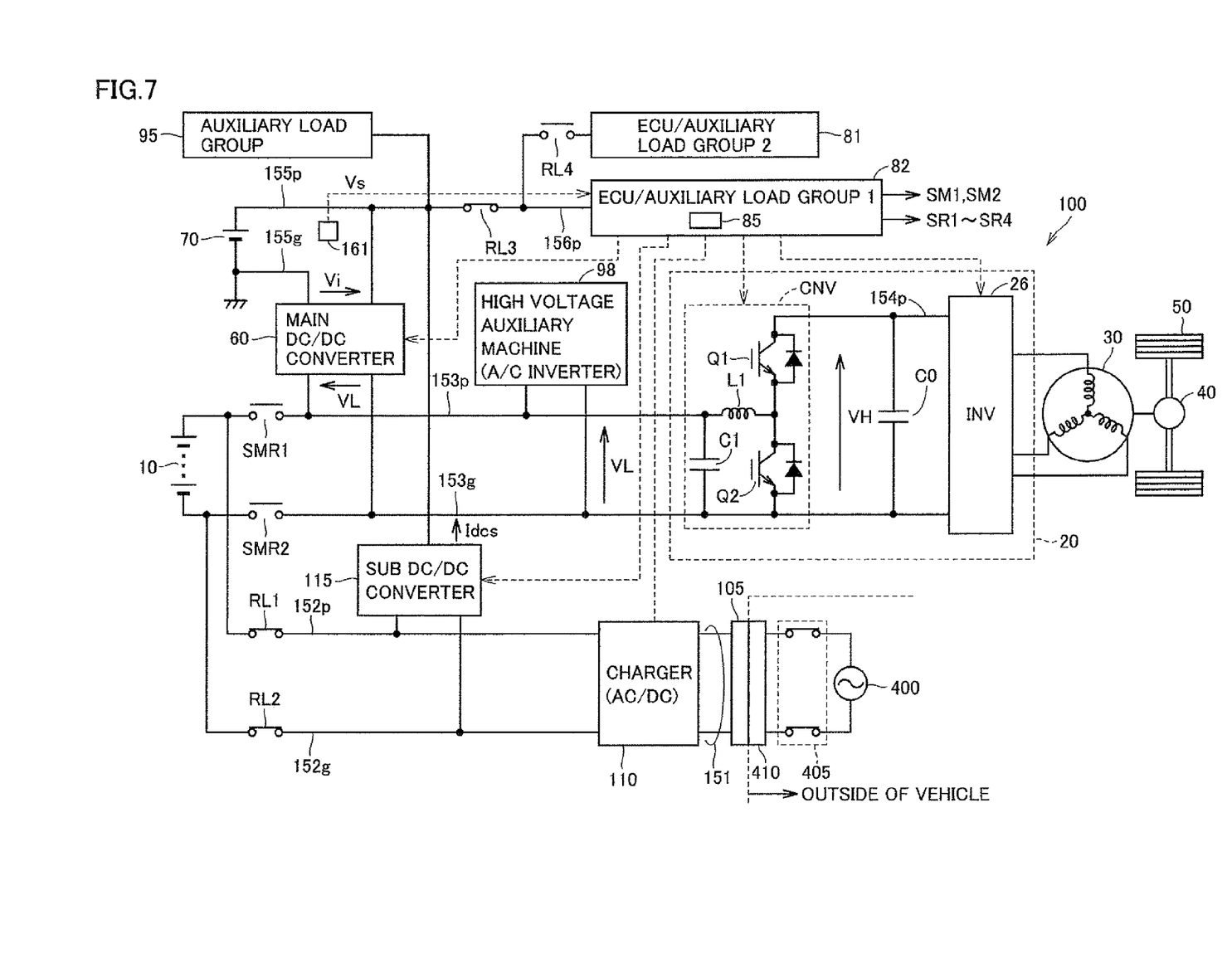
FIG. 7 is a block diagram showing a configuration of a power source system for an electric powered vehicle in accordance with a modification of the embodiment of the present invention.

FIG. 7 is a block diagram showing a configuration of a power source system for an electric powered vehicle in accordance with a modification of the embodiment of the present invention.

The power source system in accordance with the modification shown in FIG. 7 is different from the configuration of power source system shown in FIG. 1 in that it additionally includes a relay RL4. ECU 80 and auxiliary load group 90 shown in FIG. 1 are classified into ECU/auxiliary load group 81 connected to a power supply line 156p not through relay RL4, and ECU/auxiliary load group 82 connected to power supply line 156p through relay RL4.

Relay RL4 is turned on when the vehicle is running, and turned off at the time of external charging. Therefore, ECU/auxiliary load group 81 consists of equipment and devices that are used at the time of external charging, of the ECU and auxiliary load group 90.

On the other hand, ECU/auxiliary load group 82 consists of ECU and auxiliary loads that are not used at the time of external charging. Specifically, of the ECU 80 shown in FIG. 1, at least the portion corresponding to control circuit 85 (FIG. 2) must be included in ECU/auxiliary load group 82. Configurations and operations of other portions of the power source system shown in FIG. 7 are the same as those of the power source system shown in FIG. 1 and, therefore, detailed description will not be repeated.

In the power source system in accordance with the modification shown in FIG. 7, the destination to which electric power is supplied in the low voltage system at the time of external charging can be narrowed. Therefore, power consumption of the ECU and auxiliary machines at the time of external charging can be reduced, and the capacity of sub DC/DC converter 115 can be made smaller. As a result, efficiency of external charging can further be improved.

In the configurations shown in FIGS. 1 and 7, main battery 10 corresponds to the "main power storage device," and auxiliary battery 70 corresponds to the "sub power storage device." Further, main DC/DC converter 60 corresponds to the "first voltage converter," and sub DC/DC converter 115 corresponds to the "second voltage converter." Further, system main relays SMR1 and SMR2 correspond to the "first switch," and external charging relays RL1 and RL2 correspond to the "second switch." Power supply line 155p corresponds to the "power supply line" supplying electric power for the auxiliary system, power supply lines 153p and ground line 153g correspond to the "main power supply line", and ECU 80 corresponds to the "controller."

In the configuration shown in FIG. 7, relay RL4 corresponds to the "third switch," ECU/auxiliary load group 81 corresponds to the "first auxiliary load" and ECU/auxiliary load group 82 corresponds to the "second auxiliary load."

Further, in the present embodiment and in the modification thereof, the configuration following power supply line 153p (load side) is not limited to the configuration shown in the figures. By way of example, in the configuration of PCU 20, converter CNV may be omitted, and the output voltage of main battery 10 may be directly used as the DC side voltage of inverter 26. Further, the loads of power source system may have arbitrary configurations, including the configuration for generating the power for driving the vehicle. Specifically, the present invention is commonly applicable to electric powered vehicles mounting an externally chargeable power storage device and an electric motor for generating power for driving wheels formed to be driven by the electric power from the power storage device, including electric vehicles and fuel cell vehicles not mounting an engine as well as hybrid vehicles mounting an engine.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention is applicable to an electric powered vehicle mounting a power storage device chargeable by a power source outside the vehicle.

REFERENCE SIGNS LIST

10 main battery, 20 PCU, 26 inverter, 30 motor generator, 40 power transmission gear, 50 driving wheels, 60 main DC/DC converter, 70 auxiliary battery, 80 ECU, 81, 82 ECU/auxiliary load group, 85 control circuit, 90, 95 auxiliary load group, 98 high-voltage auxiliary load, 100 electric powered vehicle, 105 charging connector, 110 charger, 115 sub DC/DC converter, 151, 152p, 153p, 154p, 155p, 156p power supply line, 152g, 153g, 155g ground line, 400 external power source, 405 relay, 410 charging plug, C0, C1 smoothing capacitor, CNV converter, ides output current, L1 reactor, MDC control command (main DC/DC converter), Q1, Q2 power semiconductor switching element, RL1, RL2 external charging relay, RL3, RL4 relay (low voltage system), SM1, SM2 control command (system main relay), SDC control command (sub DC/DC converter) SMR1, SMR2 system main relay, VH, VL DC voltage, Vs power supply voltage (low power voltage system)

The invention claimed is:

1. A power source system for an electric powered vehicle chargeable by an external power source outside of the vehicle, comprising:
   rechargeable main power storage device and sub power storage device;
   a charger for converting electric power supplied from said external power source to an electric power for charging said main power storage device, at a time of external charging for charging said main power storage device by said external power source;
   a power control unit for controlling driving of an electric motor for generating vehicle driving power, by electric power conversion between said main power storage device and said electric motor;
   a first switch connected between said main power storage device and said power control unit;
   a second switch connected parallel to said first switch, between said charger and said main power storage device;
   a plurality of auxiliary loads formed to operate by the supply of electric power for auxiliary system from a power supply line connected to said sub power storage unit;
   a first voltage converter for converting an output voltage of said main power storage unit to a level of an output voltage of said sub power storage device and outputting to said power supply line;
   a second voltage converter, having an output capacity smaller than said first voltage converter, for converting an output voltage of said charger to the level of the output voltage of said sub power storage device and outputting to said power supply line; and
   a controller operated by electric power supplied from said sub power storage device, for controlling open/close of said first and second switches as well as operation and stop of said first and second voltage converters; wherein
   said controller is adapted such that
   at the start of said external charging, said first switch is opened and said second switch is closed, said first voltage converter is stopped and said second voltage converter is operated, and when the electric power for said auxiliary system is determined to be insufficient during execution of said external charging, said first voltage converter is operated.

2. The power source system for an electric powered vehicle according to claim 1, wherein
   if it is determined that insufficiency of the electric power for said auxiliary system is solved while said first voltage converter is operating during execution of said external charging, said controller again stops operation of said first voltage converter, so that the electric power for said auxiliary system is supplied by the output of said second voltage converter.

3. The power source system for an electric powered vehicle according to claim 1, wherein
   said first switch is connected between a main power supply line connected to said power control unit and said main power storage device;
   said first voltage converter is electrically connected between said main power supply line and said power supply line; and
   said controller is adapted such that when said first voltage converter is operated during execution of said external charging, said first switch is also closed.

4. The power source system for an electric powered vehicle according to claim 3, wherein
   said controller is adapted such that
   if an output of said sub power storage device becomes lower than a prescribed lower limit level while said electric powered vehicle is not running, said first switch is closed and said first voltage converter is operated, so that said sub power storage device is charged by the electric power from said main power storage device.

5. The power source system for an electric powered vehicle according to claim 1, wherein
   said plurality of auxiliary loads include
   a first auxiliary load electrically connected through a third switch to said power supply line, and
   a second auxiliary load electrically connected to said power supply line not through said third switch; and
   said controller opens said third switch at the time of said external charging.

6. The power source system for an electric powered vehicle according to claim 1, wherein
   when a voltage of said power supply line becomes lower than a prescribed voltage during execution of said external charging, said controller determines that the electric power for said auxiliary system is insufficient.

7. The power source system for an electric powered vehicle according to claim 6, wherein
   said prescribed voltage is determined corresponding to a lower limit voltage ensuring operations of said plurality of auxiliary loads and said controller.

8. A method of controlling a power source system for an electric powered vehicle chargeable by an external power source outside of the vehicle; wherein
   said power source system including
   rechargeable main power storage device and sub power storage device,
   a charger for converting electric power supplied from said external power source to an electric power for charging said main power storage device, at a time of external charging for charging said main power storage device by said external power source,
   a power control unit for controlling driving of an electric motor for generating vehicle driving power, by electric power conversion between said main power storage device and said electric motor,
   a first switch connected between said main power storage device and said power control unit,
   a second switch connected parallel to said first switch, between said charger and said main power storage device,
   a plurality of auxiliary loads formed to operate by the supply of electric power for auxiliary system from a power supply line connected to said sub power storage unit,
   a first voltage converter for converting an output voltage of said main power storage unit to a level of an output voltage of said sub power storage device and outputting to said power supply line, and
   a second voltage converter, having an output capacity smaller than said first voltage converter, for converting an output voltage of said charger to the level of the output voltage of said sub power storage device and outputting to said power supply line;

said control method comprising the steps of:

confirming that said first switch is opened at the start of said external charging:

when opening of said first switch is confirmed, closing said second switch, and activating said second voltage converter;

after closing said second switch, externally charging said main power storage device by an output of said charger; and if the electric power for said auxiliary system is determined to be insufficient during said external charging, operating said first voltage converter.

9. The method of controlling power source system for an electric powered vehicle according to claim 8, further comprising the step of again stopping operation of said first voltage converter, if it is determined that insufficiency of the electric power for said auxiliary system is solved while said first voltage converter is operating during execution of said external charging.

10. The method of controlling power source system for an electric powered vehicle according to claim 8, wherein said first switch is connected between a main power supply line connected to said power control unit and said main power storage device;

said first voltage converter is electrically connected between said main power supply line and said power supply line;

said control method further comprising, the step of closing said first switch and operating said first voltage converter, so that said sub power storage device is charged by the electric power from said main power storage device, if an output of said sub power storage device becomes lower than a prescribed lower limit level while said electric powered vehicle is not running.

11. The method of controlling power source system for an electric powered vehicle according to claim 8, wherein at said operating step, when a voltage of said power supply line becomes lower than a prescribed voltage during execution of said external charging, the electric power for said auxiliary system is determined to be insufficient.

12. The method of controlling power source system for an electric powered vehicle according to claim 11, wherein said prescribed voltage is determined corresponding to a lower limit voltage ensuring operations of said plurality of auxiliary loads and said controller.

* * * * *